United States Patent [19]

Nock

[11] Patent Number: 5,120,086
[45] Date of Patent: Jun. 9, 1992

[54] PIPE CONNECTION

[76] Inventor: Ernst Nock, Kraftwerkstr. 40, 7889 Grenzach-Whylen 2, Fed. Rep. of Germany

[21] Appl. No.: 666,551

[22] Filed: Mar. 7, 1991

Related U.S. Application Data

[63] Continuation of Ser. No. 268,746, Nov. 8, 1988, abandoned.

[30] Foreign Application Priority Data

Nov. 30, 1987 [DE] Fed. Rep. of Germany ....... 3740585
Jun. 9, 1988 [DE] Fed. Rep. of Germany ....... 3819729

[51] Int. Cl.⁵ .............................................. F16L 17/06
[52] U.S. Cl. ................................ 285/334.2; 285/328; 285/334.5; 285/368; 285/382; 285/414; 285/906; 285/917
[58] Field of Search ...................... 285/334.2, 370, 371, 285/328, 917, 368, 334.5, 382, 414, 906

[56] References Cited

U.S. PATENT DOCUMENTS

| 381,869 | 4/1888 | Williams ............... 285/334.2 X |
| 660,862 | 10/1900 | Lovekin ............... 285/328 X |
| 1,595,310 | 8/1926 | Mueller et al. ......... 285/328 X |
| 1,821,867 | 9/1931 | Wilson ................. 285/334.2 |
| 1,834,581 | 12/1931 | Ferrell et al. ......... 285/328 |
| 3,556,568 | 1/1971 | King ................... 285/334.2 |

FOREIGN PATENT DOCUMENTS

| 614140 | 6/1935 | Fed. Rep. of Germany ...... 285/917 |
| 2638018 | 3/1977 | Fed. Rep. of Germany ...... 285/917 |
| 6805184 | 10/1968 | Netherlands ............... 285/917 |
| 172459 | 8/1960 | Switzerland ............... 285/334.2 |

Primary Examiner—Dave W. Arola
Attorney, Agent, or Firm—Learman & McCulloch

[57] ABSTRACT

The invention relates to a pipe connection in which an intermediate ring which is provided on its end faces with sealing lips is inserted between the widened pipe ends and clamping means are provided which brace the widened pipe ends and the intermediate ring together in a force-locking manner, the sealing lips of the intermediate ring being plastically deformed.

11 Claims, 5 Drawing Sheets

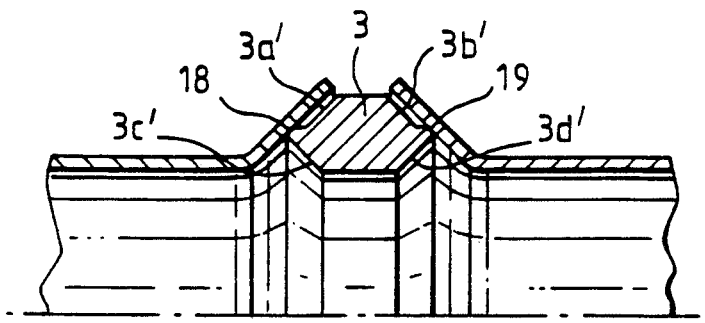
Fig. 5.
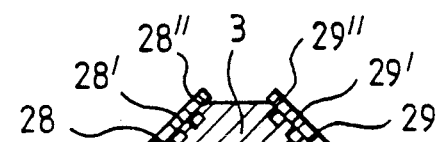
Fig. 6.
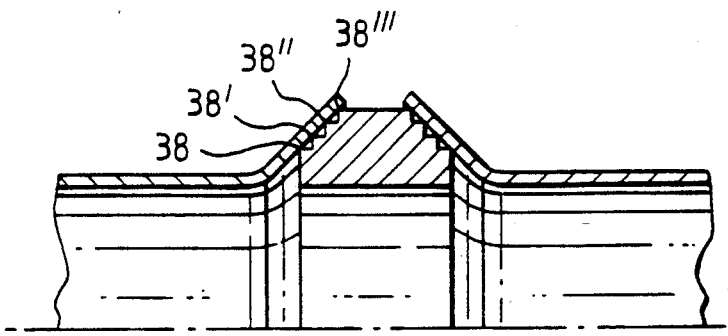
Fig. 7.
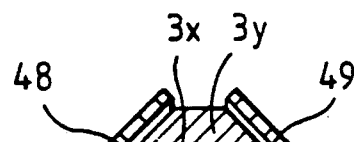
Fig. 8.
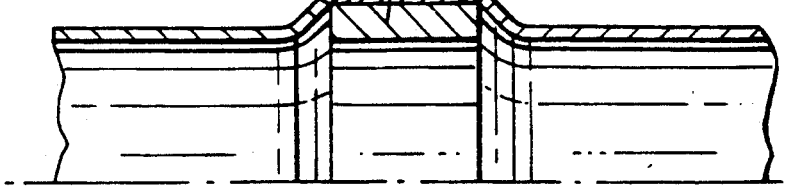

PIPE CONNECTION

This is a continuation of copending application Ser. No. 07/268,746 filed on Nov. 8, 1988, now abandoned.

BACKGROUND OF THE INVENTION

The invention relates to a pipe connection, especially a high-pressure pipe connection without seals.

The high-pressure pipe connections which have been known until now generally have flanges of relatively large dimensions, and the minimum pipe wall thickness to be chosen for a predetermined pressure is generally determined by the possibilities for connection.

The object of the invention is to provide a novel pipe connection, especially a high-pressure pipe connection without seals, which is distinguished by substantial material savings on the pipes to be connected and on the connecting elements.

SUMMARY OF THE INVENTION

In the pipe connection according to the invention the pipe ends and the intermediate ring are braced together in a force-locking manner by the clamping means in such a way that a satisfactory metal seal is produced by the plastic deformation. In this way separate sealing elements are unnecessary and a chemical and physical resistance is produced which is appropriate to the pipe material. Because of the metal seal the pipe connection is fireproof.

Compared with known flange connections the solution according to the invention provides considerable material savings on the pipes to be connected and on the connecting parts. The pipe wall thickness is not determined by the possibilities for connection but can be planned according to the physical requirements.

Assembly and dismantling of the pipe connection according to the invention are simple. It requires no welding or soldering and involves only short working times. Except for the intermediate ring all the parts of the pipe connection can be used again.

The pipe connection according to the invention is particularly suitable for pipe materials which permit cold deformation of 15 to 20%, for example refined steels, steels, copper, aluminium etc.

THE DRAWINGS

Certain embodiments of the invention are shown in the accompanying drawings wherein:

FIGS. 2–7 are partial cross-sectional views of various pipe connections including different forms and arrangements of sealing lips;

FIG. 8 is a partial cross-sectional view of a composite intermediate seal combined with pipe ends;

DETAILED DESCRIPTION

Figure 1:
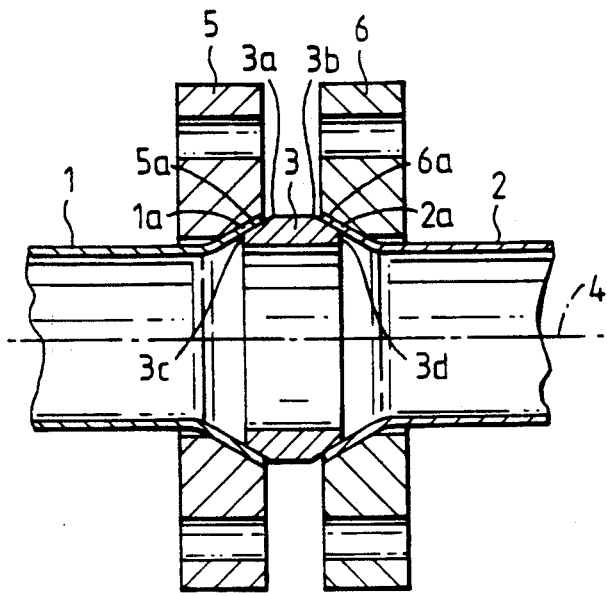
FIG. 1 is a cross-sectional view of a pipe connection including in part a clamping assembly.
Figure 2:
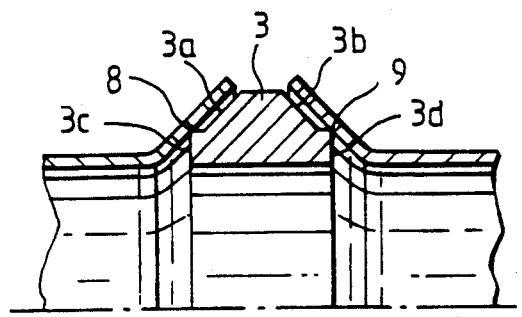

In the embodiment of the pipe connection according to the invention which is shown is FIGS. 1 and 2 an intermediate ring 3 which is arranged coaxially and has an external diameter somewhat greater than the external diameter of the pipes 1, 2 is inserted between the pipes 1 and 2 which are to be connected to one another.

One part (3a, 3b) of the two end faces of the intermediate ring 3 is tapered conically towards the exterior. Towards the interior an end face part 3c, 3d which is formed by a plane surface running at right angles to the axis of the intermediate ring is connected to the conically tapered part. An annular sealing lip 8, 9 is provided at the transition between the plane and conically tapered part of the end faces.

The ends 1a, 2a facing the intermediate ring 3 of the pipes 1, 2 which are to be connected to one another are widened conically, and the cone angle of the widened part corresponds approximately to the cone angle of the taper of the parts 3a, 3b of the end face of the intermediate ring 3.

Clamping means are also provided by means of which the widened pipe ends 1a, 2a and the intermediate ring 3 can be braced in a force-locking manner with one another in the axial direction of the pipes, so that the sealing lips 8, 9 are deformed plastically so that a sealed connection is produced between the pipe ends and the intermediate ring.

In the embodiment according to FIG. 1 these clamping means have two flanges 5, 6 which are braced in the axial direction by means of screws (which are not shown in FIG. 1). The bore diameter of the flanges 5, 6 corresponds approximately to the external diameter of the pipes 1, 2.

On the side facing the intermediate ring 3 the bore of the flanges 5, 6 becomes a cone surface 5a, 6a, the cone angle of which corresponds to the conical parts 3a, 3b of the intermediate ring 3.

The cone angle of the individual cone surfaces (relative to the pipe axis 4) is preferably between 30° and 45°, for example approximately 37°.

The widening of the pipe ends 1a, 2a is advantageously 1.1 to 1.5 times, preferably 1.15 to 1.2 times the internal diameter of the pipes.

As a rule the intermediate ring 3 is made from the same material as the pipes 1, 2. The internal diameter of the intermediate ring 3 corresponds approximately to the internal diameter of the pipes.

The bolt circle diameter and the external form of the flanges 5, 6 are substantially smaller than in conventional flanges. The weight is only a fraction (for example 30%) of a conventional flange.

The usual commercial screws can be used as connecting elements in the embodiment according to FIG. 1.

In the production of the pipe connection the widened pipe ends 1a, 2a are held between the conical surfaces of the intermediate ring 3 and the flanges 5, 6. This produces a force-locking connection of the two pipe ends to the intermediate ring. The loading capacity of the connection corresponds both physically and chemically to that of the two pipes.

The sealing lips 8, 9 on the end faces of the intermediate ring 3 are plastically deformed by the tension of the screws and in this way equalize any irregularities such as occur for example on longitudinally welded pipes. In this way a satisfactory metal seal is achieved.

Figure 3:
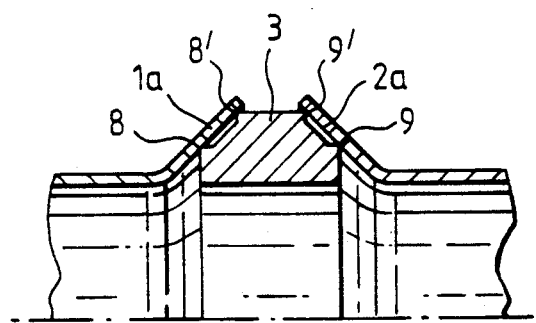

In the embodiment according to FIG. 3 two sealing lips 8, 8' and 9, 9' are provided on each of the two end faces of the intermediate ring 3 and are arranged a certain distance apart. Otherwise the construction of the intermediate ring 3 and of the widened pipe ends 1a, 2a corresponds to the embodiment according to FIGS. 1 and 2.

Figure 4:
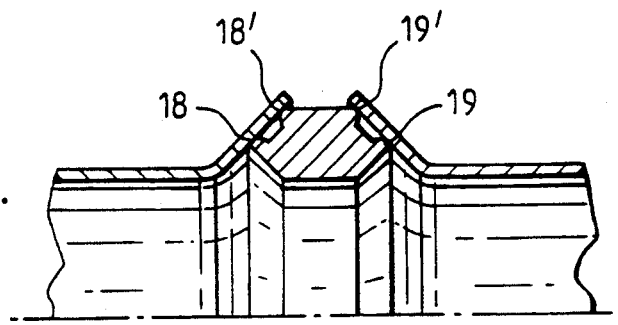

Whereas in the two previously described embodiments the sealing lips have an approximately triangular cross-section, tapering or almost tapering towards the exterior, in the embodiment according to FIG. 4 sealing lips 18, 18', 19, 19' are provided which have an approximately semi-circular cross-section.

In the variant according to FIG. 5 the two end faces of the intermediate ring 3 are tapered conically towards the interior and towards the exterior (parts 3a', 3b', 3c', 3d'), and the annular sealing lips 18, 19 are provided at the transition between the two conical surfaces.

FIG. 6 shows a variant in which three sealing lips 28, 28', 28" and 29, 29', 29" of approximately rectangular cross-section are provided in the region of each of the end faces of the intermediate ring 3.

FIG. 7 shows a variant with four annular sealing lips (38, 38', 38", 38"') of approximately triangular cross-section on each of the two conically tapered end faces of the intermediate ring 3.

According to FIG. 8 the intermediate ring is composed on an inner ring part 3x with plane end faces and an outer ring part 3y with conical end faces. The two ring parts 3x and 3y can be firmly connected to one another in a suitable manner or simply loosely inserted one inside the other. The length of the inner ring part 3x is somewhat greater than that of the outer ring part 3y, so that the outer edges of the inner ring part 3x form the annular sealing lips 48, 49.

Figure 9:
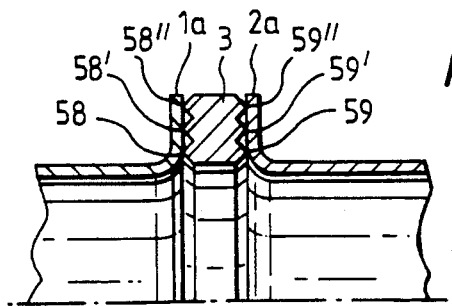
FIG. 9 is a partial cross-sectional view of another form of pipe connection.

According to FIG. 9 the end faces of the intermediate ring 3 which are each provided with three annular sealing lips 58, 58', 58", 59, 59', 59" extend on the whole at right angles to the axis of the intermediate ring. The ends 1a, 2a of the pipes facing the intermediate ring are widened like flanges at right angles to the pipe axis.

Figure 10:
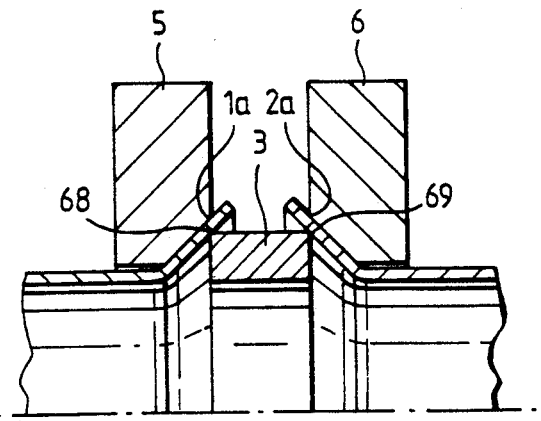
FIG. 10 is a partial cross-sectional view of another pipe connection including parts of a clamping assembly.

In the embodiment according to FIG. 10 the intermediate ring 3 has plane end faces, and the annular sealing lips 68, 69 are formed by the outer edges of the intermediate ring 3. The pipe ends 1a, 2a are also widened conically in this embodiment and are braced in a force-locking and form-locking manner by means of the flanges 5, 6 or other clamping means with the intermediate ring 3, the sealing lips 68, 69 being plastically deformed.

Figure 11:
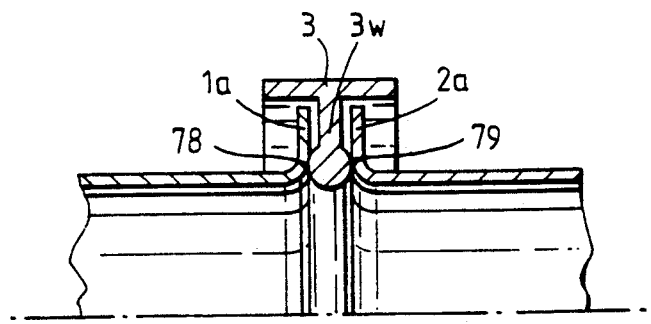
FIGS. 11 and 13 are cross-sectional views of T-shaped pipe connections.

In the variant illustrated in FIG. 11 the intermediate ring 3 has an essentially T-shaped cross-section, in which the web 3w of the intermediate ring which engages between the flange-like widened pipe ends 1a, 2a bears the sealing lips 78, 79 which are formed by a thickened part of circular cross-section.

Figure 12:
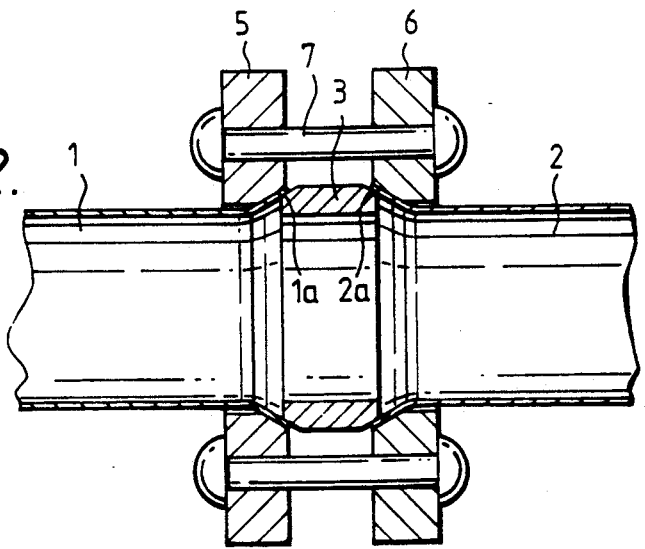
FIG. 12 is a cross-sectional view of a rivet clamping assembly useful in the present invention.

In the embodiment according to FIG. 12 the same reference numerals are used for the same components as in FIGS. 1 and 2. Rivets 7 are used here as connecting elements which brace the pipe ends 1a, 2a, the intermediate ring 3 and the flanges 5, 6 in a force-locking manner in the axial direction.

Figure 13:
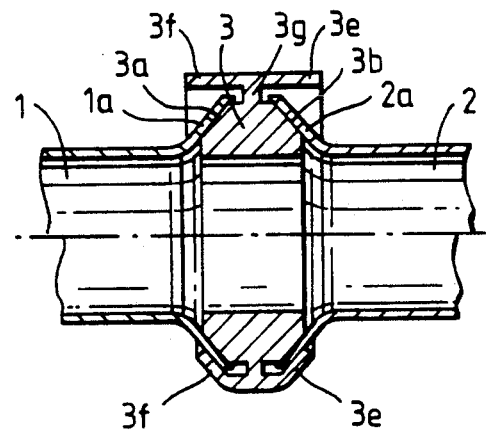

In the embodiment according to FIG. 13 the clamping means are formed by two deformable annular projections 3e, 3f which are borne by a cross-piece 3g arranged on the outer periphery of the intermediate ring 3, the cross-piece 3g and the two annular projections 3e, 3f being firmly connected to the intermediate ring 3, preferably constructed integrally with it. It is of course possible for them to be made from different materials and firmly connected to one another.

In the upper half of FIG. 13 the clamping means 3e, 3f are shown in the undeformed state, whereas the lower half of FIG. 3 shows the pipe connection in the closed state. Here the annular projections 3e, 3f are deformed in such a way that they press the widened ends 1a, 2a of the pipes 1, 2 in a force-locking manner onto the conical end faces of the intermediate ring 3. The conical end faces of the intermediate ring 3 are provided with sealing lips according to one of the variants already described above.

Generally speaking, in the pipe connection according to the invention any clamping means can be used which apply sufficient force in the axial direction on the widened pipe ends in order to deform the sealing lips of the intermediate ring plastically and to produce a force-locking connection of the pipe ends to the intermediate ring. The most varied types of screw connections are also possible, for example.

Figure 14:
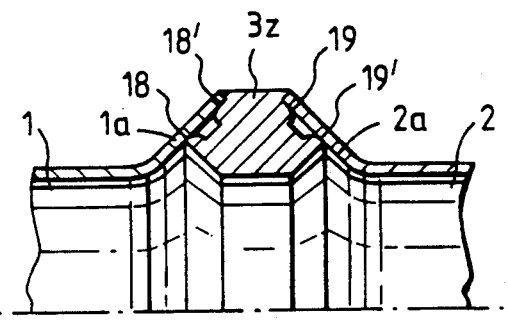
FIG. 14 is a partial cross-sectional view of a preferred form of pipe connection.

In the embodiment according to FIG. 14 the intermediate ring 3 is broadened in the outer region 3z and has inwardly tapering surfaces on which seat the end faces of the conically widened pipe ends 1a, 2a. The ring also has outwardly tapering surfaces underlying the pipe ends. The inwardly tapering surfaces provide support for the pipe ends to ensure that the intermediate ring 3 is not pushed inwards by the tensional force of the clamping means (not shown in FIG. 14). Such support is of particular advantage for pipes of large diameter.

In the embodiment according to FIG. 14 the construction of the intermediate ring 3 otherwise corresponds to the embodiments according to FIGS. 2 to 8. The outwardly tapering surfaces of the sealing ring are grooved to provide spaced sealing lips e.g. 18, 18' and 19, 19' on the outwardly tapering surfaces of the intermediate ring.

Figure 15:
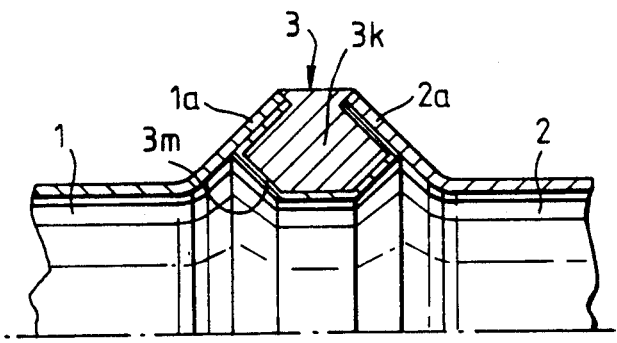
FIG. 15 is a partial cross-sectional view of a modified pipe connection of the type illustrated in FIG. 14.

In the embodiments described above, the sealing surfaces are without exception constructed as annular sealing lips. By contrast, FIG. 15 shows a variant in which the intermediate ring 3 has a core 3k made from a material with a high strength value and a surface layer 3m which is easily deformable and forms one of the sealing surfaces. This deformable surface layer takes care of the sealing, in place of the annular sealing lips, when the pipe ends 1a, 2a and the intermediate ring 3 are clamped together by the clamping means (not shown in FIG. 15). The solid core 3k of the intermediate ring 3 takes up the forces which occur during force-locking connection.

In the embodiments described with the aid of FIGS. 1 to 14 the intermediate ring can also be made from a material which has a greater hardness than the pipe material. In this case during force-locking clamping of the pipe ends and the intermediate ring there is a plastic deformation of the surfaces of the pipe ends which are in contact with the sealing surfaces of the intermediate ring. Thus the seal is achieved by the deformation of the widened pipe wall which abuts the sealing surfaces or sealing lips.

Finally, FIGS. 16 to 19 show more embodiments for the application of the pipe connection according to the invention to the connection of fittings and machines. In this case one of the two pipes to be connected to one another is formed by a stub which is provided on the fitting or the machine and has a cone adapted to the intermediate ring.

Figure 16:
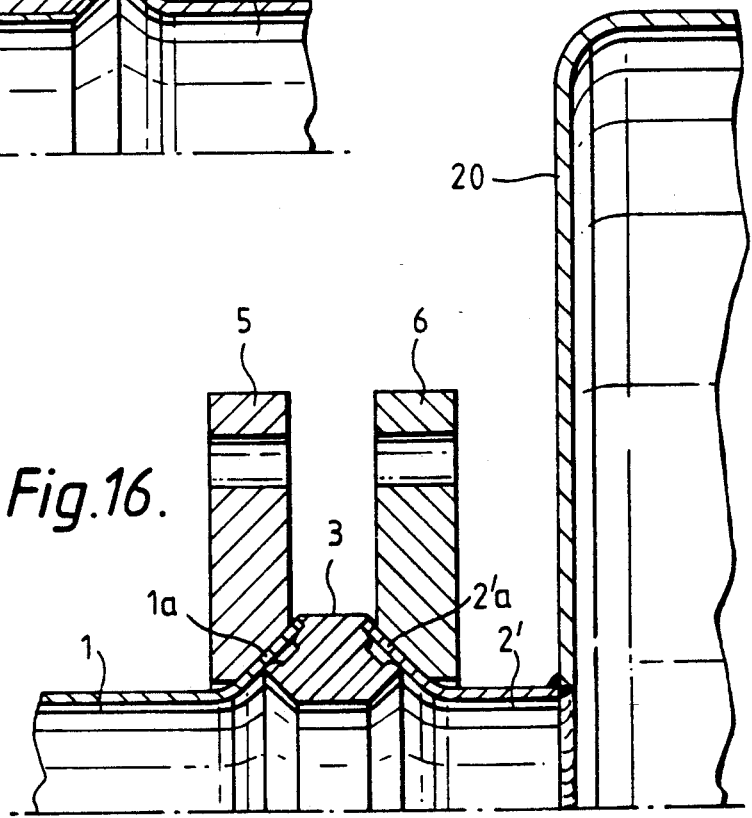
FIGS. 16–19 are partial cross-sectional views of the type of pipe connection of FIG. 14 illustrating the same combined with various forms of clamping assemblies.

In the embodiment according to FIG. 16 a stub 2' which has its end 2'a conically widened and is connected to the end 1a of the pipe 1 by means of the intermediate ring 3 as already described in connection with FIG. 14 is welded on the machine housing 20. Flanges 5, 6 serve as clamping means.

Figure 17:
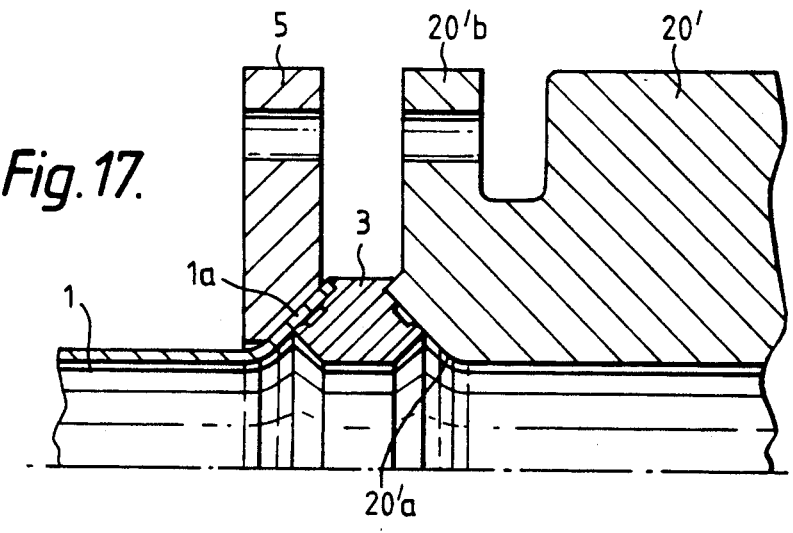

In a variant of this construction, in the embodiment shown in FIG. 17 the machine housing 20' has a cone 20'a formed on it and a flange 20'b which is also formed on it. The intermediate ring 3 has the form described in connection with FIG. 14. By means of the flanges 5 and 20'b the pipe end 1a, the intermediate ring 3 and the cone 20'a are braced together and the sealing lips of the intermediate ring 3 are plastically deformed.

Figure 18:
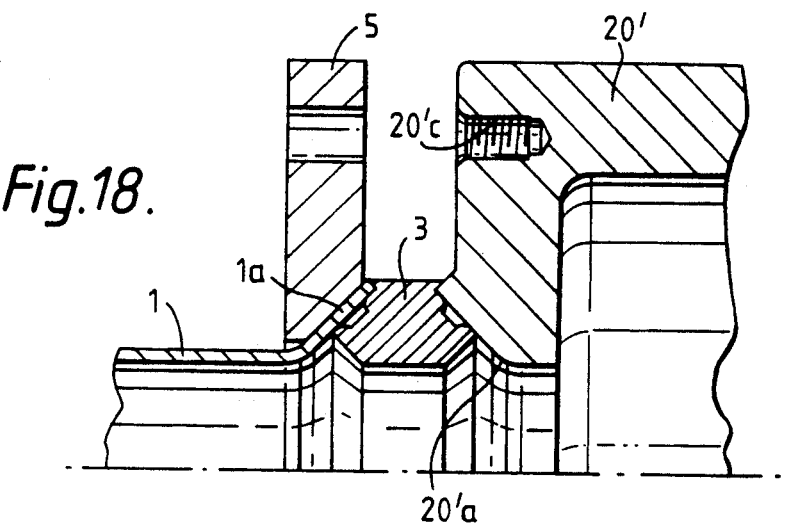

The embodiment according to FIG. 18 is similar to FIG. 17. The machine housing 20' has a cone 20'a formed on it for the intermediate ring 3 to rest against as well as threaded bores 20'c to receive tightening screws (not shown) by means of which the flange is drawn towards the machine housing 20' as the sealing lips of the intermediate ring 3 are plastically deformed.

Figure 19:
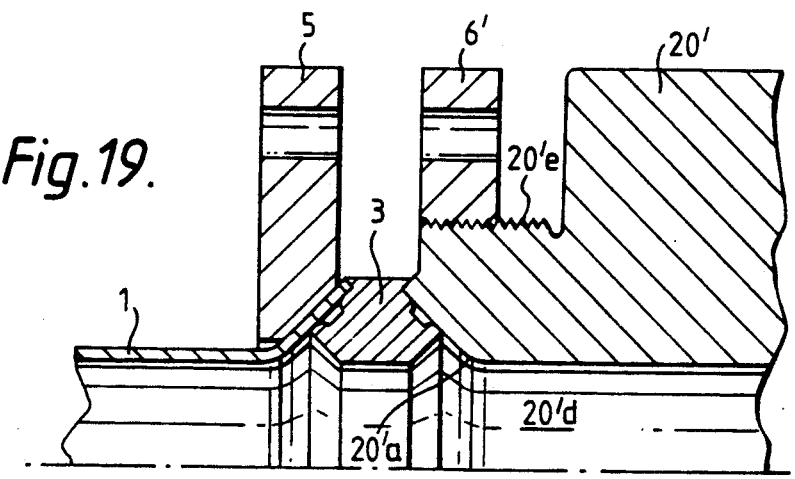

In the embodiment illustrated in FIG. 19 the machine housing 20' is provided with a stub 20'd formed on it which has a cone 20'a for the intermediate ring 3 to rest against and has on its outer casing side a thread 20'e which serves to receive a flange 6' provided with an internal thread. In this embodiment the connection can be produced and released by a common rotary movement of the flanges 5, 6' (connected to one another by clamping means) about the pipe axis, without altering the relative position of the flanges 5, 6' with respect to one another.

What is claimed is:

1. A high pressure pipe connection for providing a seal between two cylindrical pipes having outwardly flaring, confronting ends each of which terminates in an annular end face having a sealing surface, said connection comprising a ring coaxial with said pipes interposed between said pipe ends and forming a joint therewith, said ring having an outer surface the diameter of which is at least as great as that of said pipe ends, opposite sides of said ring having annular sealing surfaces tapering inwardly from adjacent said outer surface and on which the sealing surfaces of the respective pipe ends seat, said opposite sides of said ring having outwardly tapering surfaces underlying and providing support for said pipe ends, and clamping means on opposite sides of said joint urging said pipe ends toward one another under such force as to effect sealing engagement between the sealing surfaces of said pipe ends and the sealing surfaces of said ring, the seating of the sealing surfaces of said pipe ends on said annular sealing surfaces preventing inward displacement of said ring.

2. Pipe connection as claimed in claim 1 wherein each of the opposite sides of said ring has a plurality of annular sealing surfaces spaced apart from one another.

3. Pipe connection as claimed in claim 1 wherein each of the opposite sides of said ring has a plurality of annular sealing surfaces forming sealing lips at the transition between the inwardly and outwardly tapering surfaces.

4. Pipe connection as claimed in claim 1 wherein the diameter of each pipe end is 1.1 to 1.5 times the internal diameter of the pipe.

5. Pipe connection as claimed in claim 1 wherein the diameter of each pipe end is 1.2 to 1.5 times the internal diameter of the pipe.

6. Pipe connection as claimed in claim 1 wherein the clamping means comprise two flanges having a bore diameter approximately corresponding to the external diameter of the pipes.

7. Pipe connection as claimed in claim 6 wherein the bore of the flange on the side thereon facing the ring has a conical surface which widens towards the adjacent end face at a cone angle corresponding to the tapered surface of the flaring pipe ends.

8. Pipe connection as claimed in claim 1 wherein the ring has a core made from a material having a relatively high strength value and a relatively easily deformable surface layer which forms a sealing surface.

9. Pipe connection as claimed in claim 1 wherein the ring is made from a material the hardness of which is greater than the hardness of the pipe material.

10. Pipe connection as claimed in claim 1 wherein one of the pipes comprises a stub formed on some other part and having a cone adapted to the ring.

11. Pipe connection as claimed in claim 10 wherein the stub is provided with an external thread.

* * * * *